(12) United States Patent
Schenk et al.

(10) Patent No.: US 8,850,711 B2
(45) Date of Patent: Oct. 7, 2014

(54) MOUNTING DEVICE OF A LENGTH MEASURING SYSTEM

(75) Inventors: Oliver Schenk, Palling (DE); Tarek Nutzinger, Vachendorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 74 days.

(21) Appl. No.: 13/604,853

(22) Filed: Sep. 6, 2012

(65) Prior Publication Data

US 2013/0068909 A1    Mar. 21, 2013

(30) Foreign Application Priority Data

Sep. 15, 2011   (DE) .......................... 10 2011 082 755

(51) Int. Cl.
| | | |
|---|---|---|
| *A45B 3/08* | (2006.01) | |
| *B26D 7/28* | (2006.01) | |
| *G01D 5/347* | (2006.01) | |
| *G01D 5/244* | (2006.01) | |

(52) U.S. Cl.
CPC ........ *G01D 5/24442* (2013.01); *G01D 5/34753* (2013.01)
USPC .................................. 33/712; 33/700; 33/707

(58) Field of Classification Search
USPC ................. 248/489, 490, 496, 476, 477, 488; 312/245, 246, 111; 33/700, 707, 712
See application file for complete search history.

(56) References Cited

U.S. PATENT DOCUMENTS

| | | | |
|---|---|---|---|
| 4,509,262 A | | 4/1985 | Nelle |
| 4,586,760 A | | 5/1986 | Welker |
| 4,593,471 A | | 6/1986 | Nelle |
| 4,709,892 A | * | 12/1987 | Gurgui ........................... 248/250 |
| 4,720,069 A | * | 1/1988 | Bessinger ...................... 248/250 |
| 4,982,508 A | * | 1/1991 | Nelle et al. ....................... 33/702 |
| 5,692,717 A | * | 12/1997 | Glaeser .......................... 248/250 |
| 5,775,656 A | * | 7/1998 | Roberts et al. ................. 248/250 |
| 5,921,411 A | * | 7/1999 | Merl .......................... 211/90.01 |
| 5,979,238 A | * | 11/1999 | Boege et al. ...................... 73/490 |
| 7,121,015 B2 | * | 10/2006 | Boge ................................ 33/707 |
| 7,726,615 B2 | * | 6/2010 | Rutz ............................... 248/250 |
| 2004/0103551 A1 | * | 6/2004 | Wahl et al. ....................... 33/707 |
| 2004/0261283 A1 | * | 12/2004 | Falkinger et al. ............... 33/707 |
| 2008/0191107 A1 | | 8/2008 | Pucher et al. | |

FOREIGN PATENT DOCUMENTS

| | | |
|---|---|---|
| DE | 33 02 643 C2 | 1/1987 |
| DE | 10 2005 027 025 A1 | 12/2006 |
| EP | 0 118 607 B1 | 2/1989 |
| EP | 0 185 072 B1 | 1/1992 |
| JP | 8-201020 A | 8/1996 |
| WO | WO 85/05544 A1 | 12/1985 |

OTHER PUBLICATIONS

European Search Report regarding corresponding European patent application 12 17 1913 mailed Dec. 13, 2012.

* cited by examiner

*Primary Examiner* — Nkeisha Smith
(74) *Attorney, Agent, or Firm* — Brinks Gilson & Lione

(57) ABSTRACT

A mounting device for mounting a length measuring system extending in a measurement direction, the mounting device including a basic body, a steadying device attached to the basic body and a retainer attached to the basic body. A length measuring system that extends in a measurement direction is fixable on the basic body by clamping between the steadying device and the retainer, wherein the basic body and the retainer are embodied for guiding the retainer on the basic body longitudinally in a manner fixed against relative rotation in a direction of the steadying device by an adjusting element.

10 Claims, 5 Drawing Sheets

MOUNTING DEVICE OF A LENGTH MEASURING SYSTEM

RELATED APPLICATIONS

Applicants claim, under 35 U.S.C. §119, the benefit of priority of the filing date of Sep. 15, 2011 of a German patent application, copy attached, Serial Number 10 2011 082 755.2, filed on the aforementioned date, the entire contents of which is incorporated herein by reference.

BACKGROUND

1. Technical Field

The present invention relates to a mounting device for mounting a length measuring system on a machine part, in particular on a machine tool.

2. Background Information

One such mounting device, in the form of a mounting rail, is described in European patent disclosure EP 0 185 072 B1. The mounting rail includes a wall, a lower protrusion, and an upper protrusion, wherein the space between the two protrusions serves to receive a scale housing. The lower protrusion acts as a steadying device on which the scale housing is braced. A plurality of screws in the form of pressure screws are screwed into the upper protrusion. The screws press on a chamfered face of the scale housing and, thus, force the scale housing against the wall of the mounting rail, on the one hand, and against the lower protrusion of the mounting rail, on the other hand.

OBJECTS AND SUMMARY OF THE INVENTION

It is an object of the present invention to provide a mounting device of minimal structural size with which a length measuring system can be retained as stably as possible.

This object is attained by a mounting device for mounting a length measuring system extending in a measurement direction, wherein the length measuring system is fixable on a basic body by clamping between a steadying device and a retainer. The basic body and the retainer are embodied for guiding the retainer on the basic body longitudinally in a manner fixed against relative rotation in the direction of the steadying device by an adjusting element.

For longitudinal guidance, at least one guide face is embodied on the basic body for guiding the retainer thereon in a manner fixed against relative rotation in the direction of the steadying device.

Advantageously, the retainer has a first portion that is capable of being brought into engagement with both the length measuring system and a second portion of the retainer. The second portion of the retainer is embodied for guiding the retainer on the at least one guide face of the basic body in a manner fixed against relative rotation in the direction of the steadying device. The first portion of the retainer can have at least one lug-like protrusion, which is embodied for effecting a compression of material upon the engagement with the length measuring system.

For especially stable longitudinal guidance of the retainer on the basic body, the basic body has a recess in which the retainer is guided in a manner fixed against relative rotation.

Advantageously, the recess has two guide faces extending parallel to one another and which constrain the retainer in the measurement direction.

For the sake of saving space, the basic body has a wall with an inner attachment face on which, with the length measuring system received on it, a face of the length measuring system rests. The recess is made in the above mentioned wall of the basic body so that the retainer is guided in a manner fixed against relative rotation at a back side of the length measuring system on the basic body.

Preferably, the steadying device is a protrusion integrally formed on the basic body.

The adjusting element for shifting the position of the retainer on the basic body is preferably a screw that engages a female thread of the retainer.

The screw can be embodied to be drivable on both ends, wherein on both ends of the screw is a profile for a screwdriver.

The retainer preferably has a hook with which the retainer forms a positive locking with the basic body.

In a preferred embodiment, the basic body is a mounting rail extending in the measurement direction. The mounting rail includes a plurality of recesses, each of which is for the guidance in a manner fixed against relative rotation of a respective retainer and spaced apart from one another in the measurement direction.

For retaining the scale housing, a single retainer on the basic body may suffice. For longer scale housings, a plurality of retainers can be provided that are spaced apart longitudinally from one another on the basic body embodied as a mounting rail. In the alternative, a plurality of basic bodies, each with at least one retainer, are disposed in succession in the longitudinal direction.

In particular, the mounting device has as its basic body a mounting rail, which, on the one hand, is embodied for fastening a scale housing onto itself and, on the other hand, for mounting the scale housing on a machine part. To that end, the mounting rail has a retention mechanism.

An object of the present invention is furthermore to provide a structural unit having a mounting device and a mounted length measuring system.

The structural unit includes the mounting device for attaching the length measuring system extending in a measurement direction. The length measuring system is fixed on a basic body between a steadying device and a retainer by clamping, and the basic body and the retainer are embodied for longitudinally guiding the retainer on the basic body in a manner fixed against relative rotation in the direction of the steadying device by an adjusting element.

The structural unit is preferably designed such that the basic body has at least one recess in which the retainer is guided in a manner fixed against relative rotation, and the at least one recess is provided at the back side of the length measuring system.

The present invention will now be described in further detail in terms of an exemplary embodiment.

In the drawings:

DETAILED DESCRIPTION OF THE PREFERRED EMBODIMENTS

Figure 1:
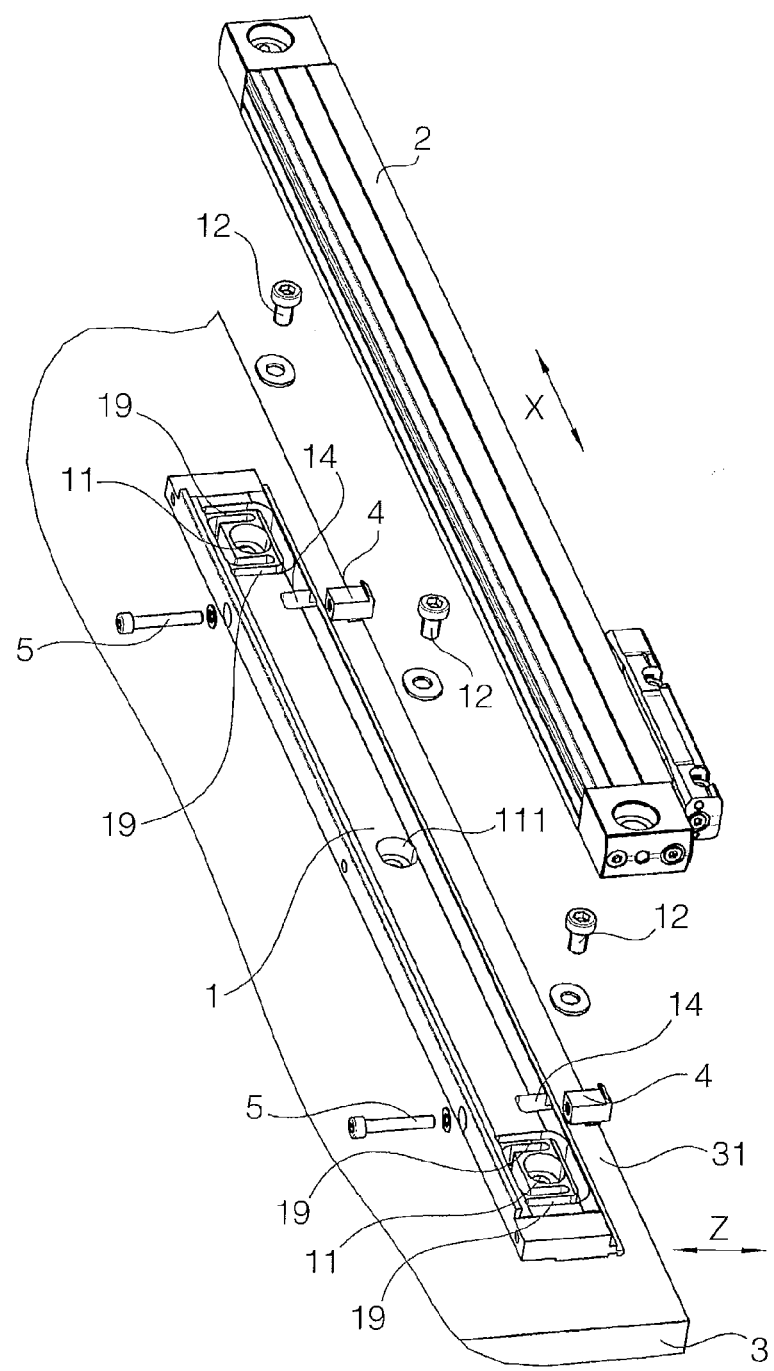
FIG. 1 is a perspective, exploded view of an embodiment of a mounting rail and a scale housing prior to being attached to one another in accordance with the present invention.

FIG. 1 shows a perspective exploded view of a mounting rail 1 and a scale housing 2 on being assembled. The mounting rail 1 serves to mount the scale housing 2 on a machine part 3. To that end, the mounting rail 1 has a structure for screwing the mounting rail onto an attachment face 31 of the machine part 3. The structure includes bores 11, 111 formed in the mounting rail 1 and fastening screws 12 for screwing into the machine part 3. The bore 111 is designed to create a fixed point, also called a reference point, of the mounting rail 1 and the machine part 3. The remaining bores 11 are designed for attaching the mounting rail 1 movably to the machine part 3 at these fastening points in the measurement direction X. To that end, the regions of the fastening bores 11 are connected to the rest of the mounting rail 1 via compensation elements, embodied here in the form of solid-state joints 19 that are deflectable in the measurement direction X by bending. The provision of compensation elements ensures that different thermal expansions of the mounting rail 1 compared to the machine part 3 are compensated for and do not cause any warping of the mounting rail 1.

Figure 2:
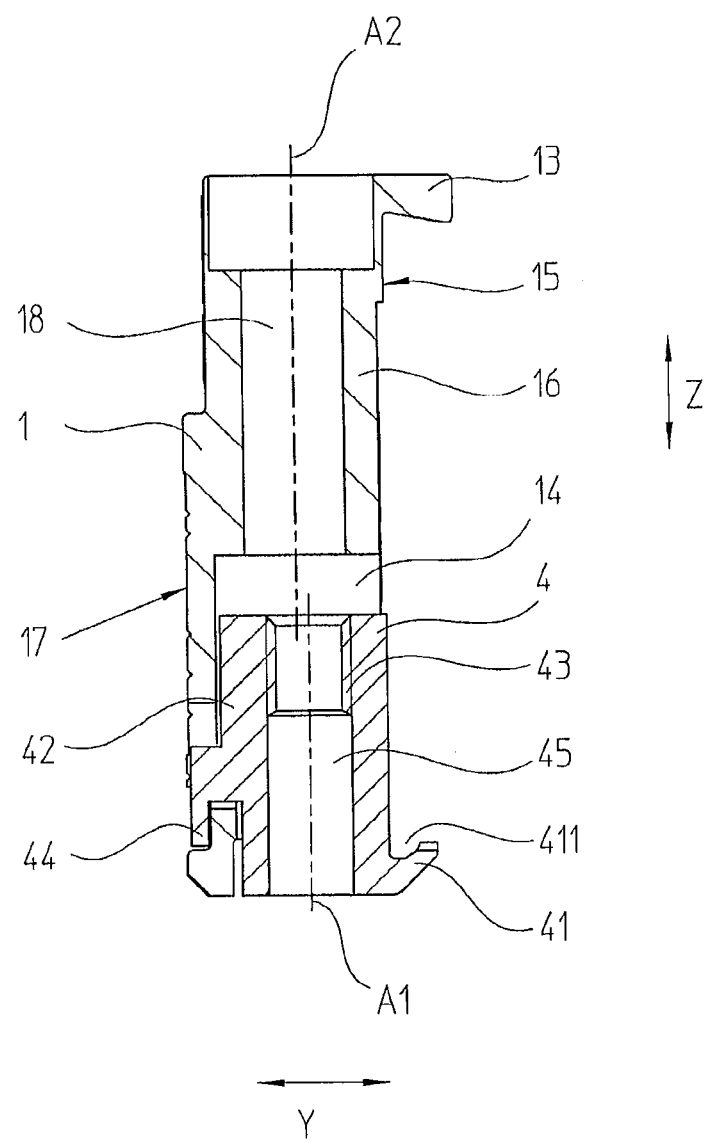
FIG. 2 shows a cross-section of the mounting rail of FIG. 1.
Figure 3:
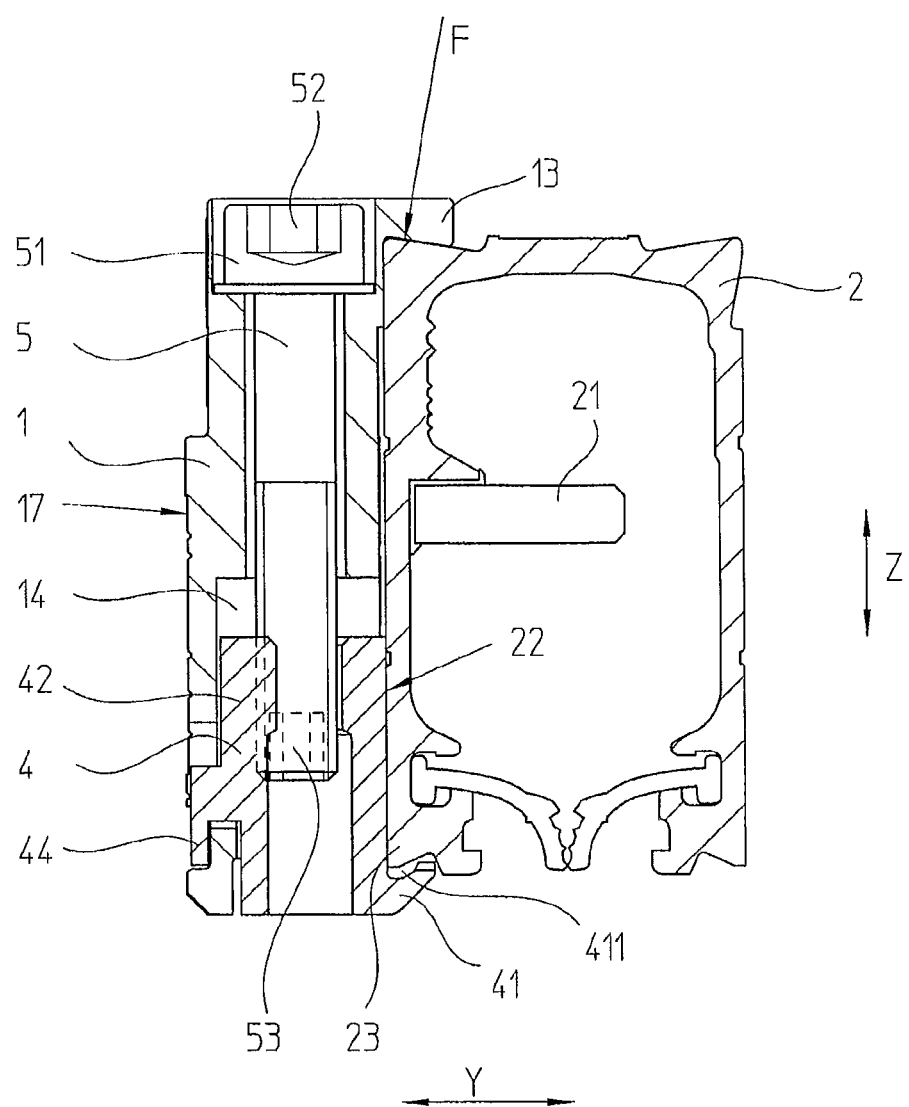
FIG. 3 shows a cross-section of the mounting rail with the scale housing of FIG. 1 attached to one another.

The mounting rail 1 also has a retention mechanism for retaining the scale housing 2 on the mounting rail 1. This retention mechanism is designed for suspending the scale housing 2 from the mounting rail 1 in the manner shown in FIG. 3. The retention mechanism of the mounting rail 1 includes at least one retainer 4. In an exemplary embodiment, there are two identical retainers 4 spaced apart from one another in the measurement direction X. The retainers 4 can each be shifted in the direction of a steadying device 13 of the mounting rail 1 as shown in FIGS. 2-3 by an adjusting element 5. This shifting takes place in a direction Z that is perpendicular to the measurement direction X. By this displacement of the retainers 4, the scale housing 2 is fastened by clamping between the steadying device 13 and the retainers 4 to the mounting rail 1.

Figure 4:
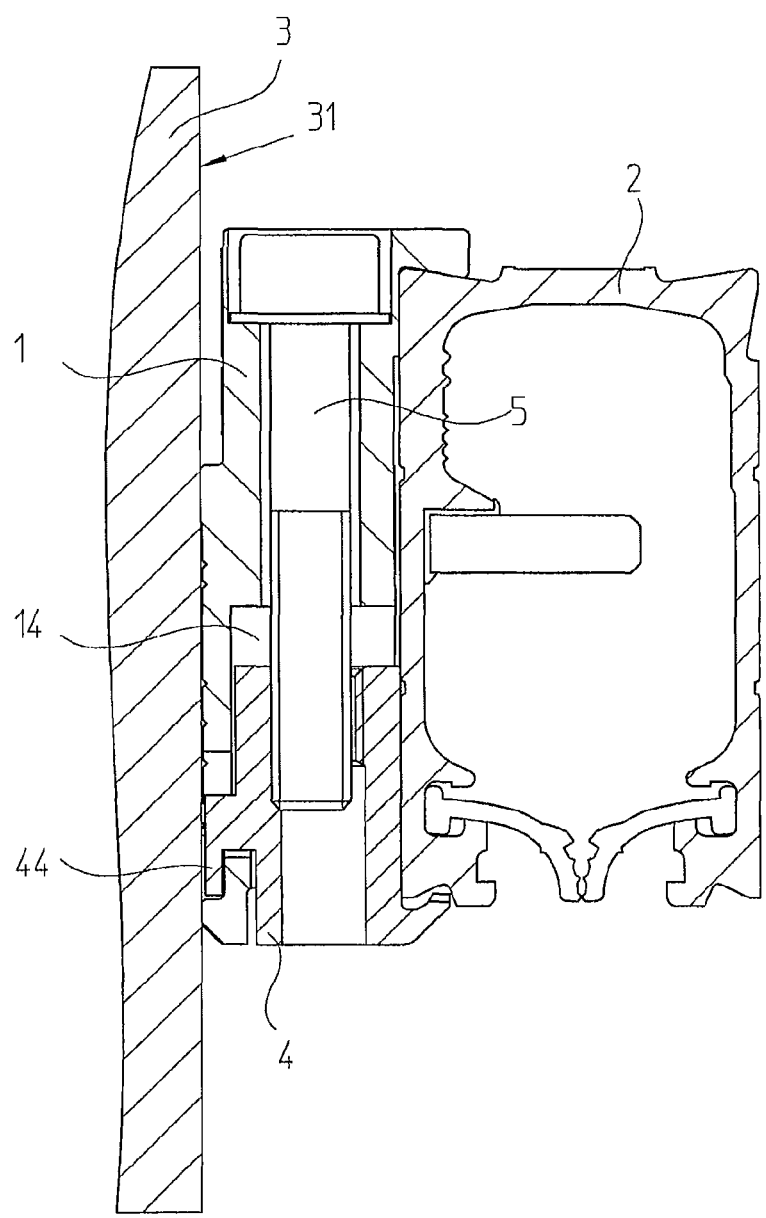
FIG. 4 shows the cross-section of the mounting rail of FIG. 3 in the state in which it is attached to a machine part in accordance with the present invention.
Figure 5:
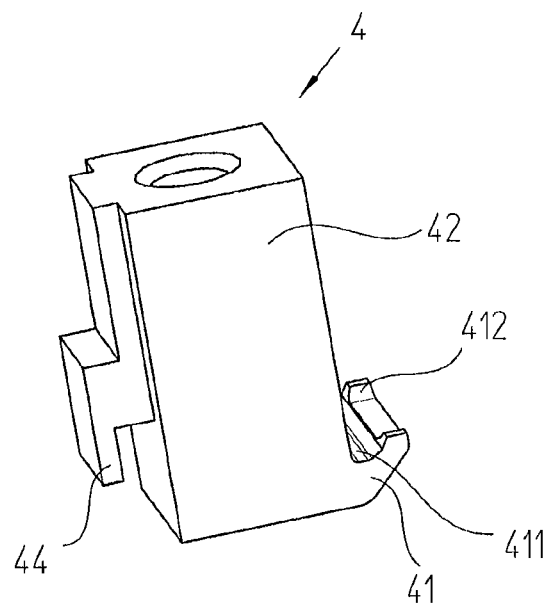
FIG. 5 shows a perspective view of an embodiment of a retainer of the mounting rail of FIG. 1.
Figure 6:
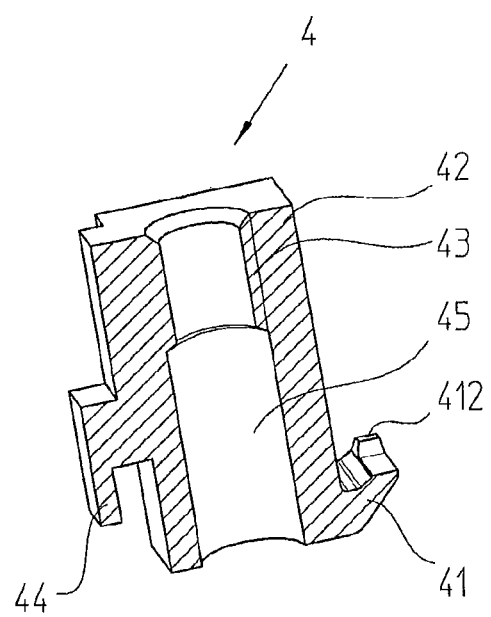
FIG. 6 is a section through the retainer of FIG. 5.

A retainer 4 is shown enlarged in FIGS. 5 and 6. Each of the retainers 4 has a first portion 41 and a second portion 42. The first portion 41 is designed for engagement with the scale housing 2 and is embodied as a protrusion projecting from the wall 16 of the mounting rail 1, in particular as a hook-like protrusion with a slot-like receptacle 411. The slot-like receptacle 411 is engaged in positive locking fashion by a protrusion 23 of the scale housing 2 as shown in FIGS. 3-4. The first portion 41 of the retainer 4 forms a kind of hook catch for the scale housing 2, into which the scale housing 2 can be hooked in positive locking fashion and which braces the scale housing 2 from below (in the Z direction).

On the first portion 41 of the retainer 4, at least one lug-like protrusion 412 is provided, which is embodied for forcing itself into the material of the scale housing 2. In other words, the protrusion 412 is used for attaining a material compression. If the scale housing 2 is made of aluminum, then the outer surface is anodized and is electrically insulating. The lug-like protrusion 412 pierces the anodized layer of an outer surface of the scale housing 2 and establishes an electrically conductive connection between the scale housing 2 and the retainer 4. Moreover, the protrusion 412 penetrating the scale housing 2 forms a positive locking, operative in the measurement direction X, between the scale housing 2 and the retainer 4.

The second portion 42 of the retainer 4 is guided in the Z direction in a recess 14 in the mounting rail 1, and the recess 14 and the second portion 42 of the retainer 4 are embodied such that the retainer 4 is displaceable, in a manner fixed against relative rotation, in the mounting rail 1 in the direction of the steadying device 13. Advantageously, the retainer 4 has a rectangular outer contour and the second portion 42 includes two side faces extending parallel to one another. In addition, the recess 14 has side faces extending parallel to one another, which form guide faces and a positive locking, operative in the measurement direction X, for both side faces of the retainer 4. This positive locking has a structure for preventing relative rotation and constrains the retainer 4 in the measurement direction X. The retainer 4 with the two portions 41 and 42 is in one piece and, in particular, is embodied as a one-piece milled part and accordingly can be manufactured inexpensively and is especially stable.

FIG. 2 shows a cross-section of the mounting rail 1 in the vicinity of one of the retainers 4 without the scale housing 2. FIG. 3 shows the same cross-section with the scale housing 2 fastened to the mounting rail 1, and FIG. 4 shows the same cross-section through the mounting rail 1 in a state in which the mounting rail 1, with the scale housing 2 fastened to it, is attached to a machine part 3. In these cross-sectional views, it can be seen that the recess 14 forming the guide for the retainer 4 is disposed in a wall 16 of the mounting rail 1. Specifically, the recess 14 is formed in a region of the mounting rail 1 between the back side 22 of the scale housing 2 and the attachment face 17 on the back side of the mounting rail 1. If the mounting rail 1 is attached to the machine part 3, this back side of the mounting rail 1 is brought into contact with the machine part 3. The second portion 42 of the retainer 4 is, thus, accommodated in an especially space-saving way and is guided stably on the mounting rail 1.

The steadying device 13 is a protrusion formed integrally and in one piece with the wall 16 of the mounting rail 1. The steadying device 13 includes a contact-pressure face that corresponds to a face of the scale housing 2, in such a way that a contact-pressure force F (see FIG. 3) with one component in the direction of the inner attachment face 15 of the mounting rail 1 and one component in the direction of the scale housing 2 results.

Once the scale housing 2 has been mounted on the mounting rail 1 as shown in FIG. 3, the scale housing 2 rests with its back side 22 on the mounting rail, and the recess 14, with the second portion 42 of the retainer 4 guided in it, extends in the wall 16 of the mounting rail 1 between the attachment face 31 and the scale housing 2. The adjusting element 5 and the guided section portion 42 of the retainer 4 are accommodated in a space-saving way in the wall 16 of the mounting rail 1 behind the reception chamber that forms the mounting rail 1 for the scale housing 2. The reception chamber is the space between the steadying device 13 and the first portion 41 of the retainer 4.

The retainer 4 can be shifted in the direction of the steadying device 13 by the adjusting element 5. The adjusting element is a screw 5, which is introduced into a bore 18 in the mounting rail 1 and is braced on the mounting rail 1 by a screw head 51. As shown in FIGS. 2 and 6, the retainer 4 has a female thread 43 into which the screw 5 can be screwed.

The retainer 4 has a through bore 45. The screw 5 is advantageously embodied such that it is rotatable on both ends by an actuating tool. To that end, each end of the screw has a profile against which a screwdriver can be placed and into which torque can be introduced. The profiles are inside profiles, such as a hexagon socket for a hex screwdriver and/or a hexagon ball socket for a torque screwdriver. In the example shown, the head 51 of the screw 5 has a hexagon socket 52. The other end of the screw 5 has a rounded hexagon socket 53 that extends into the through bore 45 and is, thus, accessible and actuatable from outside with a torque screwdriver.

As shown in FIG. 2, the center axis A1 of the female thread 43 of the retainer 4 is offset from the center axis A2 of the bore 18 in the mounting rail 1 in the Y direction toward the attachment face 15 when the scale housing 2 has been suspended from the mounting rail 1, but the screw 5 has not yet been inserted into the bore 18. When the screw 5 is screwed into the female thread 43, an initial stress on the retainer 4 in the Y direction is initiated, which as the screw 5 is screwed in forces the screw in the direction of the inner attachment face of the mounting rail 1. The offset of the two center axes A1, A2 is in a range from 0.4 to 1.0 mm.

On its back, the retainer 4 has a hook 44 that engages behind the wall 16 of the mounting rail 1 and is braced on the wall 16 such that shifting of the retainer 4 in the Y direction (to the right in terms of FIGS. 2-4) is prevented. In other words, shifting of the scale housing 2 away from the attachment face 15 is prevented. The hook 44 and the wall 16 of the mounting rail 1, thus, form a wraparound grip and hence a positive locking that prevents a tilting motion in the Y direction, and accordingly brings about a positive locking in a direction that is perpendicular to the measurement direction X and also perpendicular to the Z direction.

The hook 44 engaging the wall 16 from behind also functions to prevent the retainer from being lost in a state in which the screw 5 has not been screwed into the female thread 43, or, in other words, in the position shown in FIG. 2. The force of gravity of the retainer 4, acting downward in the Z direction, secures the position of the retainer 4 on the mounting rail 1. As can be seen in FIG. 4, the hook 44 in the attached state is positioned between the attachment face 31 and a region of the wall 16 of the mounting rail 1 and, thus, forms a sort of wraparound grip.

As shown in FIG. 3, the scale housing 2 has a scale 21 in its interior, which in a known manner is scanned in the position measurement by a scanner unit (not shown) that is movable in the measurement direction X relative to the scale 21.

If high-precision position measurement is desired, a measurement graduation of the scale 21 is designed so that it can be scanned photoelectrically. Alternatively, the measurement graduation can be designed to be scanned magnetically, capacitively, or inductively.

Besides the exemplary embodiments described, it is understood that still other modifications are possible within the scope of the present invention.

We claim:

1. A mounting device for mounting a length measuring system extending in a measurement direction, the mounting device comprising:
    a basic body, wherein a recess is formed in said basic body and wherein said recess comprises two guide faces extending parallel to one another;
    a steadying device attached to said basic body;
    a retainer attached to said basic body, wherein said length measuring system that extends in said measurement direction is fixable on said basic body by clamping between said steadying device and said retainer, wherein said basic body and said retainer are embodied for guiding said retainer on said basic body longitudinally in a manner fixed against relative rotation in a direction of said steadying device by an adjusting element, and wherein said retainer is guided in said recess in a manner fixed against relative rotation, and wherein said two guide faces constrain said retainer in said measurement direction; and
    wherein said basic body comprises a wall with an inner attachment face, on which, with said length measuring system received on it, a face of said length measuring system rests, and said recess is made in said wall so that said retainer is guided in a manner fixed against relative rotation at a back side of said length measuring system on said basic body.

2. The mounting device according to claim 1, wherein said retainer comprises a first portion that is capable of being brought into engagement with said length measuring system, and
    wherein said retainer comprises a second portion embodied for guiding said retainer on said guide face of said basic body in a manner fixed against relative rotation in said direction of said steadying device.

3. The mounting device according to claim 2, wherein said first portion of said retainer comprises a lug-like protrusion that is embodied for effecting a compression of material upon engagement with said length measuring system.

4. The mounting device according to claim 1, wherein said steadying device is a protrusion integrally formed on said basic body.

5. The mounting device according to claim 1, wherein said adjusting element is a screw, which engages a female thread of said retainer.

6. The mounting device according to claim 5, wherein said screw is drivable on both ends of said screw, in that on said both ends there is a profile for a screwdriver.

7. The mounting device according to claim 1, wherein said retainer comprises a hook with which said retainer forms a positive locking with said basic body.

8. The mounting device according to claim 1, wherein said basic body is a mounting rail extending in said measurement direction, wherein said retainer and a second retainer spaced from said retainer are positioned on said mounting rail so as to be spaced apart from one another in said measurement direction.

9. A structural unit comprising:
    a length measuring system that extends in a measurement direction and comprises a scale; and
    a mounting device to which said length measuring system is mounted, wherein said mounting device comprises:
        a basic body, wherein a recess is formed in said basic body and wherein said recess comprises two guide faces extending parallel to one another;
        a steadying device attached to said basic body;
        a retainer attached to said basic body, wherein said length measuring system that extends in a said measurement direction is fixable on said basic body by clamping between said steadying device and said retainer, wherein said basic body and said retainer are embodied for guiding said retainer on said basic body longitudinally in a manner fixed against relative rotation in a direction of said steadying device by an adjusting element, and wherein said retainer is guided in said recess in a manner fixed against relative rotation, and wherein said two guide faces constrain said retainer in said measurement direction; and
        wherein said basic body comprises a wall with an inner attachment face, on which, with said length measuring system received on it, a face of said length measuring system rests, and said recess is made in said wall so that said retainer is guided in a manner fixed against relative rotation at a back side of said length measuring system on said basic body.

10. The structural unit according to claim 9, wherein said length measuring system comprises said scale housing with a scale accommodated in an interior of said scale housing.

* * * * *